United States Patent [19]
Kirschbaum

[11] 3,746,365
[45] July 17, 1973

[54] SAFETY JACK WHEEL FOR VEHICLES

[76] Inventor: Charles J. Kirschbaum, 3300 Valdez Drive, Des Moines, Iowa 50310

[22] Filed: Aug. 25, 1971

[21] Appl. No.: 174,876

[52] U.S. Cl. .......................... 280/150 A, 254/86 R
[51] Int. Cl. ............................................ B60r 27/00
[58] Field of Search .................. 280/150 A, 150.5, 280/95; 254/86 R, 86 H

[56] References Cited
UNITED STATES PATENTS

| 2,075,926 | 4/1937 | Barr | 280/150 A |
| 2,256,310 | 9/1941 | Braley | 280/475 |
| 2,461,758 | 2/1949 | Moss | 280/150 A |
| 2,564,996 | 8/1951 | Rasbach | 254/86 R |

FOREIGN PATENTS OR APPLICATIONS

| 2,752 | 2/1890 | Great Britain | 280/150 A |
| 914,466 | 11/1953 | Germany | 280/150 A |

Primary Examiner—Leo Friaglia
Assistant Examiner—Reinhard Eisenzopf
Attorney—Morton S. Adler

[57] ABSTRACT

A safety jack wheel attachment for a vehicle such as an automobile, truck or trailer which is mounted in a relationship to a given wheel so that in the event of a tire failure or the loss of a wheel, the safety jack wheel will come into ground engaging position to support the vehicle at the point where the disabled wheel or tire has occurred.

5 Claims, 4 Drawing Figures

PATENTED JUL 17 1973  3,746,365

INVENTOR.
CHARLES J. KIRSCHBAUM
BY
ATTORNEY.

SAFETY JACK WHEEL FOR VEHICLES

BACKGROUND OF THE INVENTION

This invention relates to a safety jack wheel for vehicles to function as an automatic support in the event of a tire failure or loss of a wheel.

With the constantly increasing use of vehicles both for commercial and recreational purposes and with the high rate of sustained speeds afforded by the interstate highway system, it has been observed that there is an increasing incident of tire failures and also the not too infrequent loss of a vehicle wheel in either of which situations there is a high potential of personal and property damage. The loss of a wheel or the failure of a tire, particularly on a steerable wheel, generally results in the vehicle becoming uncontrollable with obvious serious consequences. Even a mere tire failure on a rear wheel or a trailer wheel can, if not detected immediately, result in the destruction of the entire tire which can be a relatively expensive item.

Accordingly, with the above observations in mind, one of the important objects of the present invention is to provide a safety jack wheel associated with the respective wheels on the vehicle so that in the event of a tire failure or loss of wheel, the safety jack wheel will automatically function as a ground engaging support at the point of disability.

A further object is to provide a safety wheel of the above class suitably mounted to the vehicle frame and preferably adjustable as to its relative position to the ground.

A further object of the present invention is to provide a jack wheel for a vehicle which preferably includes a solid roller.

SUMMARY

This invention is directed to a safety jack type wheel assembly or an auxiliary wheeled support for a vehicle for which there would preferably be a separate safety wheel associated with each of the vehicle wheels.

A solid roller wheel not subject to air pressure failure is carried by a rigid frame, with such frame being suitably anchored to the vehicle frame relative to a given vehicle wheel so that in normal travel, the roller member can be disposed a predetermined distance above the road surface within proper limits whereby in the event of the loss of the wheel or a tire failure, the roller becomes a ground engaging member to support the vehicle at the point of disability. Means are also provided to adjust the vertical distance of the roller relative to the road surface, if desired.

The objects of this invention together with the details of the operation outlined and the advantages of the same will be more fully described and developed in relation to the more detailed description of the accompanying drawings.

DESCRIPTION OF THE PREFERRED EMBODIMENTS

Figure 1:
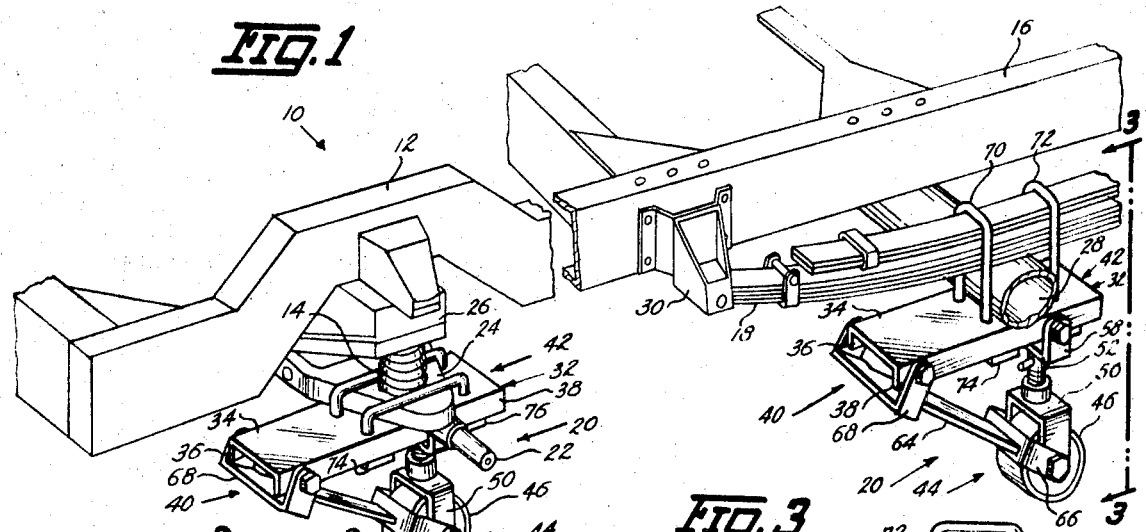
FIG. 1 is a perspective view of portions of a vehicle frame showing generally the front and rear axle components with respective coil and leaf spring suspension means and the relative association therewith of my new safety jack wheel assembly.

Referring to the drawings, one side of a vehicle frame is shown primarily for illustration and designated generally by the numeral 10. As best seen in FIG. 1, frame 10 is broken away so as to more particularly identify the forward portion 12 to which there is illustrated the use of a coil spring suspension 14 and the rear frame portion 16 to which there is mounted the leaf spring suspension 18. The showing in FIG. 1 is provided to illustrate the use of my new safety wheel assembly 20 in situations where there may either be the coil spring suspension 14 or the leaf spring suspension 18. No invention is claimed in either spring 14 or spring 18 or in their method of mounting relative to the frame 10 and they are illustrated as showing a point of reference relative to the attachment of wheel assembly 20 as will appear. Further, however, for reference purposes, it will be noted that the coil spring 14 is mounted over the front axle 22 and is intermediate the vertically spaced plate members 24 and 26. On the rear frame portion 16, there is shown the general relationship of the rear axle 28 and the relative position of spring 18 above such axle together with its attachment to bracket 30 which is secured to frame 16 all in a well known manner and arrangement.

With reference now to my safety wheel assembly 20, a rigid and sturdy mounting plate 32 is preferably made from channel material so as to present the top surface 34 and the respective opposed depending sides 36 and 38, and for purposes of convenience in descrition, plate 32 is further identified as having a front end 40 and a rear end 42. Such plate 32 carries a roller wheel assembly 44 as follows.

A roller wheel 46, preferably of solid material, is mounted for rotation on axle 48 which is suitably arranged between the opposed arms of a clevis-shaped bracket 50. To the top side or closed end of bracket 50 there is mounted a sturdy support rod or shaft 52 that is threaded on both ends with left hand threads on one end. The lower end of shaft 52 is threadably engaged through the threaded sleeve 54 on the top of bracket 50 and the upper end of rod 52 is similarly arranged relative to sleeve 56 on a second clevis-shaped bracket 58 which is oppositely oriented relative to the position of bracket 50. By the rotation of shaft 52 as will appear, the vertical distance between the closed ends of brackets 50 and 58 can be selectively shortened or lengthened within proper limits sufficient to maintain proper clearance between the bottom of shaft 52 and the roller wheel 46.

Figure 2:
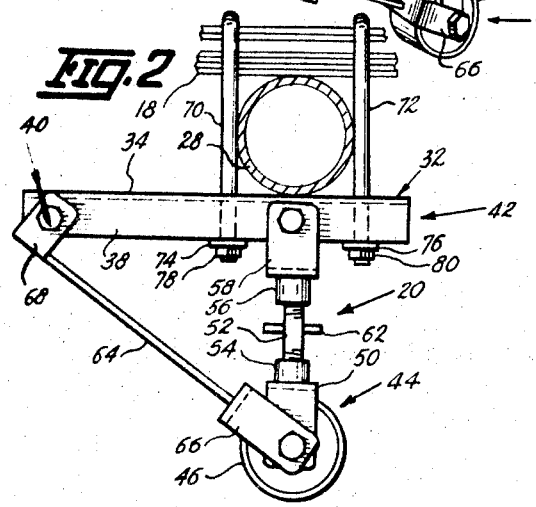
FIG. 2 is a side elevational view of this invention shown in relation to the rear axle of the vehicle.
Figure 3:
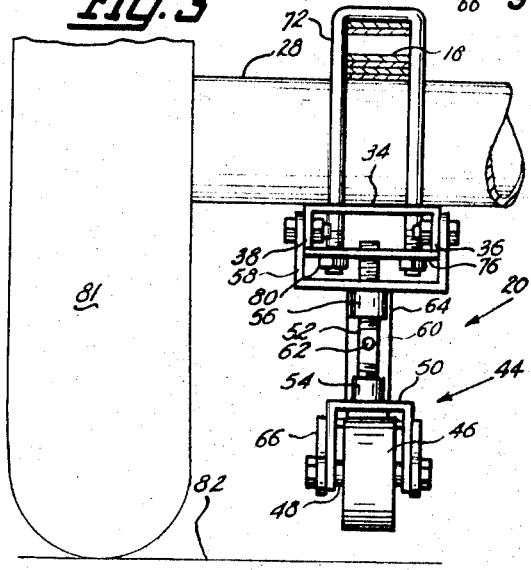
FIG. 3 is an end view of this safety wheel taken from the line 3—3 of FIG. 1 and showing in addition the relationship to the vehicle wheel when the tire on the wheel is properly inflated.

The respective arms of bracket 58 are pivotally attached to the sides 36 and 38 of plate 32 at the rear end portion 42 so that the longitudinal axis of shaft 52 and wheel 46 are disposed in vertical alignment with axle 28 for proper support as best seen in FIG. 2. Shaft 52 is provided with a transverse opening 60 at approximately its longitudinal center for the reception of a pin 62 which will facilitate the rotation of rod 52 for purposes of adjustment, if desired and it will be understood that such adjustment can also be provided in any well known manner such as air or hydraulically operated jack means.

A further support and stabilizing means for the roller wheel 46 is provided by the rigid bar 64 having the clevis-shaped bracket 66 on one end and the channel-shaped bracket 68 on the other end. Bracket 66 is pivotally mounted on axle 48 in juxtaposition to bracket 50 and bracket 68 is pivotally attached to the sides 36 and 38 of plate 32 at the front end 40 thereof whereby, as best seen in FIG. 2, bar 64 extends on a diagonal plane between end 40 of plate 32 and axle 48. Thus far described it will be appreciated that shaft 52 affords a slight vertical adjustment to raise or lower wheel 46 and this can be accommodated by the pivotal attachment of brackets 56 and 68 to plate 32. Likewise, while the roller wheel 46 will be basically supported on shaft 52, the diagonal bar 64, while permitting shaft 52 to move slightly out of a vertical plane, limits that movement to a minor variation and, therefore, serves to maintain the roller wheel assembly 44 in proper vehicle supporting alignment under the respective axles 22 and 28.

Wheel assembly 44 is of sturdy construction and is designed as an auxiliary and relatively temporary wheel support for a vehicle in the event the vehicle wheel is incapable of performing its normal function such as in the case of a tire failure or complete loss of the wheel and, therefore, it is contemplated that an assembly 44 as described will be permanently mounted on the vehicle adjacent each of the regular vehicle wheels. In FIG. 1 with reference to a rear frame portion 16 I show assembly 44 mounted in relation to a leaf spring suspension 18 and in this arrangement, the top surface 34 of plate 32 is placed in abutment to the underside of axle 28 so that the longitudinal axis of plate 32 is transversely of the longitudinal axis of axle 28.

A pair of U-bolts 70 and 72 are extended over the leaf spring 18 on opposite sides of axle 28 as best seen in FIG. 1 and the free ends of each of said U-bolts are extended through appropriate openings in top 34 and to each of the respective ends of the bolts 70 and 72 there is mounted the respective plates 74 and 76 which extend transversely of and abut the bottom edge of the sides 36 and 38 as best seen in FIG. 2. Bars 74 and 76 are secured to the respective ends of the U-bolts 70 and 72 by nuts 78 and 80. With reference to frame portion 12 which illustrates the coil spring suspension 14, roller wheel assembly 44 is mounted in substantially the same arrangement as previously described. As seen in FIG. 1 relative to spring 14, plate 34 is mounted beneath axle 22 and held in place relative to the lower plate 24 by the same type of U-bolt arrangement used for the leaf spring 18 with the only difference being the length of the U-bolts to accommodate the lesser vertical height related to axle 22 and plate 24. Accordingly, the U-bolt assembly relative to spring 14 is given like numbers as previously described.

Figure 4:
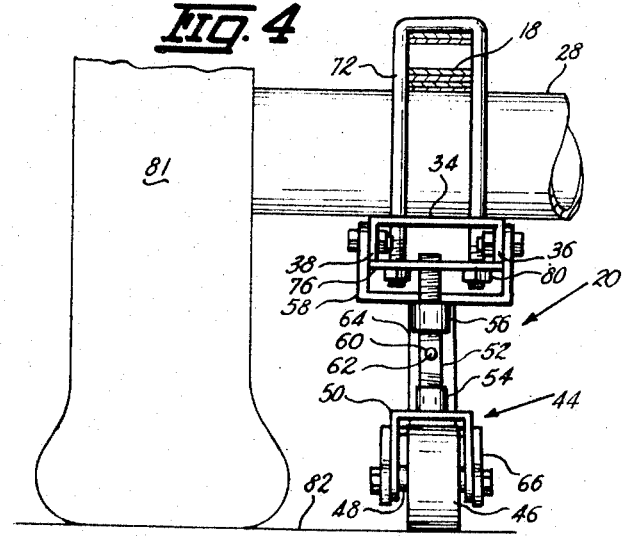
FIG. 4 is a view similar to FIG. 3 but showing the tire on the vehicle deflated with the safety wheel in ground engagement for support of the vehicle at this point.

The mounting of the roller assembly 44 is a fixed arrangement and aside from the slight adjustment of roller wheel 46, this is not a retractable type jack wheel as is usually found on many types of vehicles and particularly trailers. It will be understood that a tired wheel will be mounted on the axles such as 22 and 28 and for illustration, a tire on a wheel mounted to axle 28 is indicated generally by the numeral 81 and is shown in inflated condition relative to ground level 82 whereby it can be seen that in normal operating conditions, the roller wheel 46 is normally disposed adjacent the tire 81 and slightly elevated from the ground level 82. In FIG. 4, the tire 81 is shown deflated which would be its condition in the event of a puncture and correspondingly it will be seen that the roller wheel 46 becomes a ground engaging member at this point so that the vehicle is adequately supported at this point of the tire failure. Likewise, if any of the wheels should become detached from the axle, the roller wheel 46 would immediately engage the ground to maintain stability of the vehicle.

The operation of roller wheel assembly 46 in the event of a tire failure, for example, will permit the vehicle to be brought to a safe stop and will, of course, permit it to be driven a reasonable distance if necessary. In the event of the complete loss of a wheel, it is intended that roller wheel assembly 44 be of sufficiently sturdy construction to permit the vehicle to be driven at a slow speed for a rather considerable distance if necessary to get it to a safe place off the highway or to some suitable place where repairs can be made.

Accordingly, from all of the foregoing it is thought a full understanding of the construction and operation of this invention will be had and that the advantages of all of the improved characteristics and features of the same will be appreciated.

I claim:

1. In combination with an axle on a Vehicle wherein said axle carries a ground engaging vehicle wheel, a safety wheel comprising:
   an elongated mounting plate,
   a depending wheel assembly including a rollably mounted wheel member carried by said plate,
   a U-shaped bracket pivotally secured to one end portion of said mounting plate,
   said wheel assembly including an inverted U-shaped bracket,
   a rigid rod support engaged at respective ends with said respective U-shaped brackets,
   the longitudinal axis of said rod being disposed substantially perpendicular to the longitudinal axis of said axle, and
   said wheel member immediately becoming a rollable ground engaging member capable of supporting the vehicle in travel upon the incapacity of said vehicle wheel for its normal function.

2. A safety wheel as defined in claim 1 including:
   means for adjusting said rod support relative to said mounting plate and said wheel assembly whereby the vertical distance between said wheel assembly and said mounting plate can be selectively varied.

3. A safety wheel as defined in claim 1 including:
   said wheel assembly being disposed in depending relationship to one end portion of said mounting plate, and
   a rigid diagonal brace operatively connected at respective ends to the other end of said mounting plate and said wheel assembly.

4. A safety wheel as defined in claim 1 including:
   a rigid diagonal brace pivotally secured at one end to said inverted U-shaped bracket and similarly secured at the other end to the other end portion of said mounting plate.

5. A safety wheel as defined in claim 1 including:
   said rigid rod support being externally threaded on respective ends so that the threads on one end are in a reverse direction to the threads on the other end, and said respective threaded ends being threadably engaged with said respective U-shaped brackets whereby upon rotation of said rod the vertical distance between said wheel assembly and said mounting plate can be selectively varied to correspondingly fix the wheel member on said wheel assembly in a suitable spaced relationship above the ground for normal travel of the vehicle.

\* \* \* \* \*